United States Patent
Neff et al.

(10) Patent No.: US 9,353,020 B2
(45) Date of Patent: May 31, 2016

(54) DUST SUPPRESSING AGGREGATE

(75) Inventors: Raymond Neff, Northville, MI (US); Alexander Gershanovich, Beverly Hills, MI (US); Donald C. Mente, Gross Ile, MI (US); Rajesh Kumar, Riverview, MI (US)

(73) Assignee: BASF SE, Ludwigshafen (DE)

( * ) Notice: Subject to any disclaimer, the term of this patent is extended or adjusted under 35 U.S.C. 154(b) by 76 days.

(21) Appl. No.: 14/115,377

(22) PCT Filed: May 4, 2012

(86) PCT No.: PCT/US2012/036603
§ 371 (c)(1),
(2), (4) Date: Nov. 4, 2013

(87) PCT Pub. No.: WO2012/151530
PCT Pub. Date: Nov. 8, 2012

(65) Prior Publication Data
US 2014/0060134 A1  Mar. 6, 2014

Related U.S. Application Data

(60) Provisional application No. 61/482,959, filed on May 5, 2011.

(51) Int. Cl.
*C05G 3/00* (2006.01)
*C05C 9/00* (2006.01)

(52) U.S. Cl.
CPC ............... *C05G 3/0088* (2013.01); *C05C 9/00* (2013.01); *C05G 3/0029* (2013.01); *C05G 3/0035* (2013.01)

(58) Field of Classification Search
None
See application file for complete search history.

(56) References Cited

U.S. PATENT DOCUMENTS

| | | | |
|---|---|---|---|
| 3,450,562 A | 6/1969 | Hoeschele | |
| 4,052,347 A | 10/1977 | Dieterich et al. | |
| 4,252,919 A | 2/1981 | Wagner et al. | |
| 4,263,181 A | 4/1981 | Wagner et al. | |
| 4,283,219 A | 8/1981 | Wagner et al. | |
| 4,341,650 A | 7/1982 | Wagner et al. | |
| 4,396,733 A | 8/1983 | Wagner et al. | |
| 4,428,983 A | 1/1984 | Nehen et al. | |
| 4,711,659 A | 12/1987 | Moore | |
| 5,108,653 A | 4/1992 | Taylor | |
| 5,538,531 A | 7/1996 | Hudson et al. | |
| 5,645,624 A | 7/1997 | Naka et al. | |
| 5,986,222 A | 11/1999 | Helberg | |
| 6,001,147 A | 12/1999 | Markusch et al. | |
| 6,107,448 A | 8/2000 | Sakamoto et al. | |
| 6,152,981 A | 11/2000 | Markusch et al. | |
| 6,322,606 B1 * | 11/2001 | Komoriya et al. | 71/11 |
| 6,358,296 B1 | 3/2002 | Markusch et al. | |
| 6,364,925 B1 | 4/2002 | Markusch et al. | |
| 6,395,824 B1 | 5/2002 | Beutler et al. | |
| 6,503,288 B1 | 1/2003 | Markusch | |
| 6,509,440 B1 | 1/2003 | Sakane et al. | |
| 6,555,645 B1 | 4/2003 | Ikeda et al. | |
| 7,258,921 B2 | 8/2007 | Hashiba et al. | |
| 7,416,785 B2 | 8/2008 | Mente | |
| 2003/0089150 A1 | 5/2003 | Markusch et al. | |
| 2003/0224936 A1 | 12/2003 | Kretzschmar | |
| 2004/0180044 A1 | 9/2004 | Chao et al. | |
| 2005/0076687 A1 | 4/2005 | Whittington | |
| 2006/0094851 A1 | 5/2006 | Audenaert et al. | |
| 2008/0103265 A1 | 5/2008 | Schocker et al. | |
| 2009/0004441 A1 | 1/2009 | Haberle et al. | |
| 2009/0143542 A1 | 6/2009 | Savino et al. | |
| 2010/0326152 A1 | 12/2010 | Mente | |

FOREIGN PATENT DOCUMENTS

| | | |
|---|---|---|
| CN | 1246840 A | 3/2000 |
| CN | 1675290 A | 9/2005 |
| CN | 1956938 A | 5/2007 |
| CN | 101056700 A | 10/2007 |
| CN | 101948348 A | 1/2011 |
| DE | 19733044 A1 | 2/1999 |
| EP | 0142242 A1 | 5/1985 |
| EP | 0 867 422 A2 | 9/1998 |
| EP | 1172347 A2 | 1/2002 |
| EP | 2256142 A1 | 12/2010 |
| WO | WO 99/06459 A1 | 2/1999 |
| WO | WO 2010/149713 A1 | 12/2010 |
| WO | WO 2012/151506 A1 | 11/2012 |

OTHER PUBLICATIONS

English language abstract for CN 101056700 extracted from espacenet.com database on Dec. 29, 2014, 1 page.
English language abstract for CN 101948348 extracted from espacenet.com database on Dec. 29, 2014, 1 page.
English language abstract not found for CN 1246840; however, see English language equivalent U.S. Pat. No. 5,968,222. Original document extracted from espacenet.com database on Jan. 5, 2015, 30 pages.
English language abstract not found for CN 1675290; however, see English language equivalent U.S. Pat. No. 7,258,921. Original document extracted from espacenet.com database on Jan. 5, 2015, 74 pages.

(Continued)

*Primary Examiner* — Necholus Ogden, Jr.
(74) *Attorney, Agent, or Firm* — Howard & Howard Attorneys PLLC

(57) ABSTRACT

A dust suppressing aggregate includes a core particle and a dust suppressing agent. The dust suppressing agent comprises polycarbodiimide and is disposed about the core particle for suppressing dusting of the core particle. A method of forming the dust suppressing aggregate includes the steps of reacting isocyanates in the presence of a catalyst to form the polycarbodiimide and encapsulating the core particle with the polycarbodiimide to form the dust suppressing agent. A system for producing the dust suppressing aggregate includes the core particle, the isocyanates, and the catalyst.

20 Claims, No Drawings

(56) References Cited

OTHER PUBLICATIONS

English language abstract not found for CN 1956938; however, see English language equivalent U.S. Pat. No. 7,416,785. Original document extracted from espacenet.com database on Jan. 5, 2015, 12 pages.

English language abstract and machine translation for DE19733044 extracted from espacenet.com database on Apr. 23, 2014, 40 pages.

English language abstract for WO99/06459 extracted from espacenet.com database on Apr. 23, 2014, 43 pages.

International Search Report for PCT/US2012/036563, dated Jul. 31, 2012, 4 pages.

International Search Report for PCT/US2012/036603, dated Jul. 31, 2012, 4 pages.

\* cited by examiner

DUST SUPPRESSING AGGREGATE

RELATED APPLICATION

This application is the National Stage of International Patent Application No. PCT/US2012/036603, filed on May 4, 2012, which claims priority to and all the advantages of U.S. Provisional Patent Application No. 61/482,959, filed on May 5, 2011, the content of which is incorporated herein by reference.

BACKGROUND OF THE INVENTION

1. Field of the Invention

The subject invention generally relates to a dust suppressing aggregate. More specifically, the subject invention relates to a dust suppressing aggregate that includes a dust suppressing agent disposed about a core particle for suppressing dusting of the core particle.

2. Description of the Related Art

Fertilizers comprising particulate materials tend to generate dust during manufacturing, handling, storage, and application. Dust is generated when the particulate materials break into smaller particles. In particular, fertilizers comprising ammonium phosphates, calcium phosphates, ammonium nitrates, potassium nitrates, potassium chlorides, potassium sulfates, etc. tend to generate substantial levels of undesirable dust.

The generation of dust during manufacturing, handling, storage, and application of fertilizers is problematic for a number of reasons. Typically, dust generated is ultimately wasted, i.e., it does not reach its intended application. The dust generated does, however, typically enter the air and surrounding environs which may cause health and environmental concerns. In an effort to curtail such waste and alleviate such concerns, dust suppressants are often applied to fertilizers to reduce the generation of dust.

Dust suppressants are typically liquids, such as oils, but can be solids, such as waxes. Particular examples of dust suppressants are petroleum residue, hydrogenated mineral oil, and wax. Dust suppressants are typically spray applied onto the fertilizer. The spray application of the dust suppressant onto the fertilizer typically occurs in combination with agitation in a rotating drum or tumbler. The agitation facilitates coverage of the dust suppressant onto the fertilizer, i.e., onto the surface of the particulate materials.

To date, treatment of fertilizers has focused on dust suppressants such as mineral oils and waxes. There are disadvantages associated with such dust suppressants. Liquid dust suppressants, such as mineral oils, may volatilize and/or migrate into the fertilizer with time and lose their effectiveness. Solid dust suppressants, such as waxes, can be difficult to handle, require special application equipment, cause clumping or agglomeration, and can inhibit the dissolution/release of the fertilizer once applied.

Accordingly, there remains a need to develop an improved dust suppressing agent.

SUMMARY OF THE INVENTION AND ADVANTAGES

A dust suppressing aggregate includes a core particle and a dust suppressing agent. The dust suppressing agent comprises polycarbodiimide and is disposed about the core particle for suppressing dusting of the core particle. A method of forming the dust suppressing aggregate includes the steps of reacting isocyanates in the presence of a catalyst to form the polycarbodiimide and encapsulating the core particle with the polycarbodiimide to form the dust suppressing agent. A system for producing the dust suppressing aggregate includes the core particle, the isocyanates, and the catalyst.

The polycarbodiimide protects the core particle and minimizes the generation of dust by the core particle. The polycarbodiimide is solid, does not volatilize and/or migrate into the fertilizer with time and lose its effectiveness as a dust suppressant. Further, the isocyanates from which the polycarbodiimide is formed promotes consistent and minimal encapsulation of the core particle by the polycarbodiimide and forms the polycarbodiimide which is durable and which provides mechanical integrity to the core particle to reduce dust formed therefrom. Although the polycarbodiimide serves to protect the core particle and prevent the generation of dust, the polycarbodiimide allows for the rapid permeation of water and does not significantly inhibit the dissolution/release of the core particle.

DETAILED DESCRIPTION OF A PREFERRED EMBODIMENT

The instant invention provides a dust suppressing aggregate. The dust suppressing aggregate includes a core particle and a dust suppressing agent. The dust suppressing aggregate is typically free of liquid dust suppressants. The core particle typically includes a fertilizer that may include calcium, magnesium, nitrogen, phosphate, potassium, sulfur, and combinations thereof. The fertilizer may be selected from the group of nitrogenous fertilizers, phosphoric fertilizers, potash fertilizers, sulfuric fertilizers, and combinations thereof, e.g. mixed fertilizers. Suitable fertilizers include, but are not limited to, anhydrous ammonia, urea, ammonium nitrate, urea ammonium nitrate, potassium nitrate, calcium ammonium nitrate, calcium phosphate, phosphoric acid, monoammonium phosphate, ammonium polyphosphate, ammonium phosphate sulfate, potash, ammonium nitrate, potassium nitrate, potassium chloride, potassium sulfate, ammonium sulfate and sulfuric acid, and combinations thereof. Typical non-limiting examples of fertilizer include urea and monoammonium phosphate.

The core particle may also include components other than fertilizers. Such other components include, but are not limited to, herbicides, insecticides, fungicides, and other components for use in agricultural applications. However, the dust suppressing aggregate is not limited for use in agricultural applications and the core particle of the present invention is not limited to the fertilizer or other components described immediately above.

Although the shape of the core particle is not critical, core particles having a spherical shape are preferred. Accordingly, the core particle is typically either round or roughly spherical. Although the core particle may be of any size, the core particle typically has a particle size of from No. 170 to 5/16 in., more typically from No. 35 to No. 3½, and most typically from No. 18 to No. 5, mesh, as measured in accordance with standard sizing techniques using the United States Sieve Series. That is, the core particle typically has a particle size of from 0.1 to 7, more typically from 0.5 to 5, and most typically from 1 to 4, mm. Core particles which are round or roughly spherical and have such particle sizes typically allow less dust suppressing agent to be used and typically allow the dust suppressing agent to be disposed on the core particle with increased uniformity and completeness as compared to core particles having other particle shapes and sizes.

The dust suppressing agent comprises polycarbodiimide and is disposed about the core particle for suppressing dusting of the core particle. The polycarbodiimide may be partially or completely disposed about the core particle. Advantageously, the dust suppressing agent forms a durable layer disposed about the core particle which provides mechanical integrity to the core particle to reduce the dust formed therefrom.

As used herein, the terminology "disposed about" encompasses the dust suppressing agent being disposed about the core particle and also encompasses both partial and complete covering of the core particle by the dust suppressing agent. The dust suppressing agent is disposed about the core particle to an extent sufficient to inhibit dusting of the core particle. As such, any given sample of the encapsulated particle typically includes core particles having the dust suppressing agent disposed thereon, and the dust suppressing agent is typically disposed about a large enough surface area of each individual core particle so that the formation of dust from the core particle is minimized while the impact of the dust suppressing agent on the release of the core particle is also minimized.

Referring back, the dust suppressing agent comprises polycarbodiimide. Typically, the dust suppressing agent is formed from the reaction of the isocyanates in the presence of a catalyst. That is, the dust suppressing agent typically comprises polycarbodiimide that is the reaction product of the isocyanates in the presence of the catalyst. The dust suppressing agent can be the reaction product of one type of isocyanate. Alternatively, the dust suppressing agent can be the reaction product of at least two different isocyanates such that the isocyanate introduced above is defined as a first isocyanate and a second isocyanate that is different from the first isocyanate. Obviously, the dust suppressing agent comprising polycarbodiimide may be the reaction product of more than two isocyanates. In one embodiment, the isocyanate comprises polymeric diphenylmethane diisocyanate having an NCO content of about 31.5 weight percent and/or 4,4'-diphenylmethane diisocyanate having an NCO content of about 33.5 weight percent.

The isocyanates may include any type of isocyanate known to those skilled in the art. The isocyanate may be a polyisocyanate having two or more functional groups, e.g. two or more NCO functional groups. Suitable isocyanates for purposes of the present invention include, but are not limited to, aliphatic and aromatic isocyanates. In various embodiments, the isocyanate is selected from the group of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

The isocyanates may include an isocyanate prepolymer. The isocyanate prepolymer is typically a reaction product of an isocyanate and a polyol and/or a polyamine. The isocyanate used in the prepolymer can be any isocyanate as described above. The polyol used to form the prepolymer is typically selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the prepolymer is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof.

Specific isocyanates that may be used to prepare the dust suppressing agent include, but are not limited to, toluene diisocyanate; 4,4'-diphenylmethane diisocyanate; m-phenylene diisocyanate; 1,5-naphthalene diisocyanate; 4-chloro-1; 3-phenylene diisocyanate; tetramethylene diisocyanate; hexamethylene diisocyanate; 1,4-dicyclohexyl diisocyanate; 1,4-cyclohexyl diisocyanate, 2,4,6-toluylene triisocyanate, 1,3-diisopropylphenylene-2,4-dissocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl benzene-2,4,6-triisocyanate and 1,3,5-triisopropyl benzene-2,4,6-triisocyanate. Other suitable dust suppressing agents can also be prepared from aromatic diisocyanates or isocyanates having one or two aryl, alkyl, arylalkyl or alkoxy substituents wherein at least one of these substituents has at least two carbon atoms. Specific examples of suitable isocyanates include LUPRANATE® L5120, LUPRANATE® MM103, LUPRANATE® M, LUPRANATE® ME, LUPRANATE® MI, LUPRANATE® M20, and LUPRANATE® M70, all commercially available from BASF Corporation of Florham Park, N.J.

For example, the isocyanates used to form the dust suppressing agent can comprise LUPRANATE® M20, LUPRANATE® M, and combinations thereof. LUPRANATE® M20 has an NCO content of about 31.5 weight percent and LUPRANATE® M has an NCO content of about 33.5 weight percent. In the embodiment where the first isocyanate is further defined as a polymeric isocyanate, and the second isocyanate is further defined as a monomeric isocyanate, the polymeric isocyanate, such as LUPRANATE® M20, is typically reacted in an amount of from about 20 to about 100, more typically from about 40 to about 80, most typically from about 60 to about 70, percent by weight and the monomeric isocyanate, such as LUPRANATE® M, is typically reacted in an amount of from about 20 to about 80, more typically from about 25 to about 60, most typically from about 30 to about 40, percent by weight, both based on a total combined weight of the polymeric and monomeric isocyanates. The polymeric isocyanate and the monomeric isocyanate of this embodiment typically react in a weight ratio of 4:1 to 1:4, more typically 2.5:1 to 1:1, and even more typically 2.0:1, to form the dust suppressing agent.

The isocyanates typically include an aromatic isocyanate. More typically, the isocyanates include, but are not limited to, monomeric and polymeric methylene diphenyl diisocyanate, monomeric and polymeric toluene diisocyanate, and mixtures thereof. Most typically, the isocyanate is LUPRANATE® M20 commercially available from BASF Corporation of Florham Park, N.J.

Referring back, the dust suppressing agent typically comprises polycarbodiimide that is the reaction product of the isocyanates in the presence of the catalyst. The one or more isocyanates are typically heated in the presence of the catalyst to form the dust suppressing agent. The catalyst may be any type of catalyst known to those skilled in the art. Generally, the catalyst is selected from the group of phosphorous compounds, tertiary amides, basic metal compounds, carboxylic acid metal salts, non-basic organo-metallic compounds, and combinations thereof. For example, the one or more isocyanates may be heated in the presence of a phosphorous compound to form the dust suppressing agent. Suitable, non-limiting examples of the phosphorous compound include phosphates such as triethyl phosphate (TEP), which is represented by the following structure:

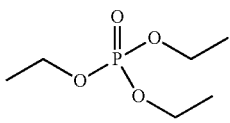

Other suitable, non limiting examples of the phosphorous compound include, but are not limited to, phospholene oxides such as 3-methyl-1-phenyl-2-phospholene oxide (MPPO), 1-phenyl- -2-phospholen-1-oxide, 3-methyl-1-2-phospholen-1-oxide, 1-ethyl-2-phospholen-1-oxide, 3-methyl-1-phenyl-2-phospholen-1-oxide, 3-phospholene isomers thereof, and 3-methyl-1-ethyl-2-phospholene oxide (MEPO). One particularly suitable phospholene oxide is MPPO, represented by the following structure:

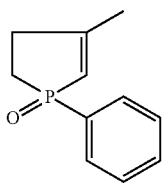

Another particularly suitable phospholene oxide is MEPO, represented by the following structure:

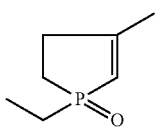

The catalyst may be present in any amount sufficient to catalyze the reaction between the isocyanates. Typically, the catalyst is present in the polycarbodiimide in an amount of greater than 0.01, more typically of from 0.5 to 10, and most typically of from 1.0 to 5.0, percent by weight based on 100 percent by weight of the isocyanates.

In a preferred embodiment, 3-methyl-1-phenyl-2-phospholene oxide is typically present in the polycarbodiimide in an amount of greater than 0.01, more typically of from 0.5 to 10, and most typically of from 1.0 to 5.0, percent by weight based on 100 percent by weight of the isocyanates.

In one embodiment, MPPO and TEP are utilized in a weight ratio of from 1:10 to 10:1, more typically from 1:5 to 3:1, and most typically from 1:3 to 1:1. In another embodiment, MPPO and dipropylene glycol are utilized in a weight ratio of from 1:10 to 10:1, more typically from 1:5 to 3:1, and most typically from 1:3 to 1:1.

Specific dust suppressing agents which are suitable for the purposes of the subject invention include, but are not limited to, monomers, oligomers, and polymers of diisopropylcarbodiimide, dicyclohexylcabodiimide, methyl-tert -butylcarbodiimide, 2,6-diethylphenyl carbodiimide; di-ortho-tolyl-carbodimide; 2,2'-dimethyl diphenyl carbodiimide; 2,2'-diisopropyl-diphenyl carbodiimide; 2-dodecyl-2'-n-propyl-diphenylcarbodiimide; 2,2'-diethoxy-diphenyl dichloro-diphenylcarbodiimide; 2,2'-ditolyl-diphenyl carbodiimide; 2,2'-dibenzyl-diphenyl carbodiimide; 2,2'-dinitro-diphenyl carbodiimide; 2-ethyl-2'-isopropyl-diphenyl carbodiimide; 2,6,2',6'-tetraethyl-diphenyl carbodiimide; 2,6,2',6'-tetrasecondary -butyl-diphenyl carbodiimide; 2,6,2',6'-tetraethyl-3, 3'-dichloro-diphenyl carbodiimide; 2-ethyl-cyclohexyl-2-isopropylphenyl carbodiimide; 2,4,6,2',4',6'-hexaisopropyl-diphenyl carbodiimide; 2,2'-diethyl-dicyclohexyl carbodiimide; 2,6,2',6'-tetraisopropyl-dicyclohexyl carbodiimide; 2,6,2',6'tetraethyl-dicyclohexy) carbodiimide and 2,2'-dichlorodicyclohexyl carbodiimide; 2,2'-dicarbethoxy diphenyl carbodiimide; 2,2'-dicyano-diphenyl carbodiimide and the like.

The polycarbodiimide can be formed in the presence of a silicone surfactant. The silicone surfactant is typically a polyorganosiloxane. A non-limiting example of a typical polyorganosiloxane is an alkyl pendent organosilicone molecule comprising a polysiloxane backbone and polyether side chains. The alkyl pendent organosilicone molecule of this example can be comb structured or dendrimer structured.

The silicone surfactant typically improves the wetting of the isocyanates on the core particle and, accordingly, may also be described as a wetting agent. The silicone surfactant also typically improves the adhesion of the polycarbodiimide to the core particle. In addition, the silicone surfactant reduces clumping and agglomeration of the dust suppressing aggregate during and after the encapsulation process. As such, the silicone surfactant promotes more complete encapsulation of the core particle by the polycarbodiimide, promotes consistent thickness of the polycarbodiimide, allows for formation of the polycarbodiimide having minimal but consistent thickness, reduces the amount of the polycarbodiimide that is required to coat the core particle thereby decreasing the amount of the isocyanates required to encapsulate the core particles with the durable polycarbodiimide. Typically, the silicone surfactant is a liquid and has a viscosity of from 100 to 1500, more typically from 200 to 1000, and most typically from 650 to 850, cSt at 25° C. The viscosity of the silicone surfactant may vary outside of the ranges above, but is typically both whole and fractional values within those ranges.

Specific examples of suitable silicone surfactants include, but are not limited to, TEGOSTAB® BF 2370, commercially available from Goldschmidt AG of Essen, DE, DABCO® DC5043 commercially available from Air Products and Chemicals, Inc. of Allentown, Pa., and NIAX® Silicone L-5340 and L-620, both commercially available from Momentive Performance Materials of Albany, N.Y. A particularly suitable silicone surfactant is NIAX® Silicone L-620, a polyalkyleneoxidemethylsiloxane copolymer. The silicone surfactant may be present in the polycarbodiimide in an amount of from 0.01 to 10, typically from 0.05 to 5, and more typically from 0.5 to 1.5, parts by weight based on 100 parts by weight of all components used to form the polycarbodiimide. The parts by weight silicone surfactant may vary outside of the ranges above, but is typically both whole and fractional values within those ranges.

The polycarbodiimide may optionally include one or more additives. The additives are typically included in the isocyanates or added separately. Suitable additives for purposes of the present invention include, but are not limited to, chain-extenders, cross-linkers, chain-terminators, processing additives, adhesion promoters, anti-oxidants, defoamers, flame retardants, catalysts, anti-foaming agents, water scavengers, molecular sieves, fumed silicas, surfactants, ultraviolet light stabilizers, fillers, thixotropic agents, silicones, colorants, pigments, inert diluents, and combinations thereof. For example, a pigment can be included in the polycarbodiimide. If included, the additives can be included in the polycarbodiimide in various amounts.

Typically, the isocyanates are reacted in an amount of from 0.1 to 7.5, more typically from 0.3 to 5.5, still more typically from 0.5 to 3.0, and most typically from 0.7 to 2.0, parts by weight based on 100 parts by weight of the core particle to form the dust suppressing agent comprising polycarbodiimide. The amount of isocyanates reacted to form the dust suppressing agent may vary outside of the ranges above, but is typically both whole and fractional values within those ranges. Further, the dust suppressing agent is typically present in the encapsulated particle in an amount of from 0.1 to 10, more typically of from 0.1 to 7.5, more typically of from 0.5 to 3.0, and most typically of from 0.7 to 2.0, parts by weight based on 100 parts by weight of the core particle. The amount of the dust suppressing agent present in the encapsulated particle may vary outside of the ranges above, but is typically both whole and fractional values within those ranges.

The dust suppressing aggregate, including the core particle and the polycarbodiimide thereon, is typically either round or roughly spherical. The dust suppressing aggregates have a size distribution reported as D[4,3], d(0.1), d(0.5), and/or d(0.9), as well defined and appreciated in the art. In several embodiments, the dust suppressing aggregates have a size distribution D[4,3] of from 0.5 to 5 mm, of from 1 to 4 mm, or of from 1 to 3 mm, with an overall particle size range of from 0.1 to mm. In other embodiments, the dust suppressing aggregates have a size distribution d(0.1) of from 0.2 to 2 mm, of from 0.4 to 1.7 mm, or of from 0.5 to 1.5 mm, with an overall particle size range of from 0.1 to 10 mm. In further embodiments, the dust suppressing aggregates have a size distribution d(0.5) of from 0.5 to 5 mm, of from 1 to 4 mm, or of from 1 to 3 mm, with an overall particle size range of from 0.1 to mm. In still other embodiments, the dust suppressing aggregates have a size distribution d(0.9) of from 0.7 to 7 mm, of from 0.8 to 5 mm, or of from 1 to 4 mm, with an overall particle size range of from 0.1 to 10 mm. The D[4,3], d(0.1), d(0.5), and d(0.9) size distributions of the dust suppressing aggregates may vary outside of the ranges above, but are typically both whole and fractional values within 0.5 to 5 mm, 0.2 to 2 mm, 0.5 to 5 mm, and 0.7 to 7 mm, respectively.

The dust suppressing agent comprising polycarbodiimide may be formed in-situ where the dust suppressing agent comprising polycarbodiimide is disposed about the core particle during formation of the dust suppressing agent comprising polycarbodiimide. Said differently, the components of the dust suppressing agent comprising polycarbodiimide, e.g., the isocyanates and the catalyst, may be combined with the core particle and the dust suppressing agent comprising polycarbodiimide forms and is disposed about the core particle simultaneously.

However, in one embodiment the polycarbodiimide is formed and some time later applied to, e.g. mixed with, the core particle and exposed to temperatures exceeding 100° C. to encapsulate the core particle. Advantageously, this embodiment allows the polycarbodiimide to be formed at a location designed to handle chemicals, under the control of personnel experienced in handling chemicals. Once formed, the polycarbodiimide can be transported to another location, applied to the core particle, and heated. Other advantages of this embodiment include quicker coating cycle times, less generation of $CO_2$ during application of the core particle, and reduced use of the catalyst. In addition to the advantages described above, there are numerous logistical and practical advantages associated with this embodiment. For example, if the polycarbodiimide is being applied to the core particle, e.g. fertilizer, the dust suppressing agent comprising polycarbodiimide may be applied immediately following the manufacturing of the fertilizer thereby simplifying the manufacturing process.

In this embodiment, the isocyanates are mixed with the catalyst to form a reaction mixture. Particularly suitable isocyanates include, but are not limited to, LUPRANATE® M20, LUPRANATE® M, and mixtures thereof. A particularly suitable catalyst is 3-methyl-1-phenyl-2-phospholene oxide. The reaction mixture is heated and the polycarbodiimide is formed. A reaction time of the reaction mixture depends on a temperature at which the reaction mixture is held, pressure, and an amount of catalyst in the reaction mixture. As the reaction time progresses, the formation of the polycarbodiimide proceeds and a molecular weight and a viscosity of the polycarbodiimide increases. After the reaction time, a mixture of the polycarbodiimide, additional isocyanates, and catalyst, in a molten state, is cooled. This mixture solidifies at ambient temperature. Typically, the mixture comprising polycarbodiimide, the isocyanates, and the catalyst, now in a solidified, crystalline state, is processed into various sizes and/or powderized. The mixture comprising polycarbodiimide, the isocyanates, and the catalyst, now a thermoplastic-like solid may be applied to the core particle. The mixture comprising polycarbodiimide, the isocyanates, and the catalyst is applied to the core particle, e.g. mixed with the core particle, and heated for a predetermined amount of time at a temperature greater than 120° F., to form the dust suppressing agent comprising polycarbodiimide As indicated above, the dust suppressing agent comprising polycarbodiimide is typically formed by reacting the isocyanates in the presence of the catalyst. However, it is to be understood that the dust suppressing agent comprising polycarbodiimide can be formed from other reactants which are not isocyanates. As just one example, the dust suppressing agent comprising polycarbodiimide of this invention can be formed with ureas, e.g. thioureas, as reactants. Other examples of reactants suitable for formation of polycarbodiimide are described in "Chemistry and Technology of Carbodiimides", Henri Ulrich, John Wiley &Sons, Ltd., Chichester, West Sussex, England (2007), the disclosure of which is hereby incorporated by reference in its entirety.

The dust suppressing performance of the dust suppressing agent can be determined. To test the dust suppressing performance of the dust suppressing agent, a dust value (ppm) of the dust suppressing aggregate is determined. Dust value is measured by placing a 50 g sample of the dust suppressing aggregate in a 125 mL wide mouth glass jar. The jar is placed in a Burrell Model 75 wrist-action shaker, and shaken for 20 minutes at the maximum intensity setting (10). After shaking, the sample is weighed and then processed in a dust removal apparatus. The dust removal apparatus consists of a 2.5 in. diameter plastic cup, a cup holder, an air flow meter, and a vacuum cleaner. The base of the cup is removed and replaced with a 200 mesh screen. Each sample is placed into the cup, the cup is placed into the holder, and then air is drawn through the sample for two minutes at a rate of 9 standard cubic feet per minute using the vacuum cleaner. The sample is then re-weighed. The amount of dust is calculated from the weight difference before and after dust removal. Results are reported as an average of two replicates.

Typically, the dust suppressing aggregate has a dust value of less than 3000, more typically less than 2000, still more typically less than 1000, even more typically less than 500, and most typically less than 250, ppm.

In one embodiment, the dust suppressing aggregate comprises the dust suppressing agent in an amount no greater than 1 part by weight based on 100 parts by weight of the dust suppressing aggregate and has an initial dust value of less than 1000, more typically less than 750, and most typically less than 500, ppm.

In another embodiment, the dust suppressing aggregate comprises the dust suppressing agent in an amount no greater than 2 parts by weight based on 100 parts by weight of the dust suppressing aggregate and has an initial dust value of less than 500, more typically less than 200, and most typically less than 150, ppm.

A dust reduction gradient (%) can be determined with the dust value. The dust reduction gradient is calculated with the following formula:

[(Dust Value A−Dust Value B)/Dust Value A]×100

Dust Value A is the dust value of the uncoated core particle
Dust Value B is the dust value of the dust suppressing aggregate comprising an identical core particle.

Said differently, once the dust value for the uncoated core particle and dust suppressing aggregate are determined under certain conditions, the dust reduction gradient (%) is the percent difference in the amount of dust generated by the uncoated core particle and the coated core particle, i.e., the dust suppressing aggregate. Typically, the larger the dust reduction gradient, the better. In one embodiment, the dust suppressing aggregate comprises the dust suppressing agent in an amount no greater than 1 part by weight based on 100 parts by weight of the dust suppressing aggregate and has an initial dust reduction gradient of greater than 10, more typically greater than 50, and most typically greater than 80, %.

In another embodiment, the dust suppressing aggregate comprises the dust suppressing agent in an amount no greater than 2 parts by weight based on 100 parts by weight of the dust suppressing aggregate and has an initial dust reduction gradient of greater than 20, more typically greater than 60, and most typically greater than 90, %.

The polycarbodiimide of the dust suppressing aggregate has minimal impact dissolution of the core particle. That is, the dust suppressing agent comprising polycarbodiimide minimally impacts the rate at which the core particle dissolves. Dissolution is the amount of core particle that dissolves in water under certain conditions and is typically measured in weight percent, as is described in greater detail immediately below.

Dissolution is measured by placing 50 g of the dust suppressing aggregate in a 250 mL plastic bottle. Then 230 g of deionized water is added to the bottle. The plastic bottle is allowed to stand undisturbed for 8 hours at room temperature (23° C.). A liquid sample is then drawn, and its refractive index is measured using a refractometer. An amount (in grams) of the core particle dissolved in each solution sample is calculated using the refractive index and a temperature-corrected standard curve. The amount of the core particle dissolved is utilized to calculate dissolution (%) with the following formula:

Dissolution (%)=$X$/(50−(Weight Percent Dust Suppressing Agent Applied/2))

$X$=the amount of core particle (grams) dissolved in the solution sample.

Weight Percent Dust Suppressing Agent Applied=100%×Weight of Dust

Suppressing Agent Applied/Weight of Dust Suppressing Aggregate

A dissolution gradient can be determined with the dissolution. The dissolution gradient is simply the difference in the dissolution (%) of the uncoated core particle and the dissolution of the core particle of the dust suppressing aggregate. Said differently, once the dissolution for the uncoated core particle and the dust suppressing aggregate are determined under certain conditions, the dissolution gradient is absolute value of the dissolution of the uncoated core particle minus the dissolution of the dust suppressing aggregate. Typically, the smaller the dissolution gradient, the better. Although the dust suppressing agent should inhibit dusting of the core particle, it is typically desired that the dust suppressing agent minimally impact the dissolution of the core particle. Typically, the dust suppressing aggregate has a dissolution gradient equal to or less than 30, more typically less than 15, still more typically less than 10, and most typically less than 5 after 1 day of aging in water at 23° C.

In addition to the dust suppressing aggregate, the subject invention relates to a system for forming the dust suppressing aggregate and a method of forming the dust suppressing aggregate. The system for forming the dust suppressing aggregate includes the isocyanates, the catalyst, and the core particle.

The subject invention also relates to a method of forming the dust suppressing aggregate comprising the core particle and the dust suppressing agent disposed about the core particle for suppressing dusting of the core particle. The method includes the steps of reacting the isocyanates in the presence of the catalyst to form the polycarbodiimide and encapsulating the core particle with the polycarbodiimide to form the dust suppressing agent.

Typically, the isocyanates and the catalyst are mixed and the isocyanates chemically react to form the polycarbodiimide. Further, the step of reacting the isocyanates in the presence of the catalyst to form the polycarbodiimide typically includes heating the isocyanates in the presence of the catalyst to a reaction temperature of greater than about 120 and more typically greater than about 150, ° F.

The method optionally includes the step of heating at least one of the isocyanates and the catalyst prior to the step of reacting the isocyanates in the presence of the catalyst to form the polycarbodiimide. If heated, at least one of the isocyanates and the catalyst can be heated to a temperature typically greater than about 120 and more typically greater than about 150, ° F. Heating at least one of the isocyanates and the catalyst facilitates the reaction of the components to form the dust suppressing agent.

As described above, the method of forming the encapsulated also includes the step of encapsulating the core particle with the polycarbodiimide to form the dust suppressing agent. The step of reacting the isocyanates and the catalyst to form the polycarbodiimide can be conducted prior to the step of encapsulating the core particle with the polycarbodiimide to form the dust suppressing agent. Alternatively, the step of reacting the isocyanates and the catalyst to form the polycarbodiimide can be conducted simultaneous with the step of encapsulating the core particle with the polycarbodiimide to form the dust suppressing agent. That is, the isocyanates, the catalyst and the core particle can be mixed together all at once. In one embodiment, at least one of the isocyanates and the catalyst are spray applied onto the core particle. The isocyanates and the catalyst can be spray applied sequentially or simultaneously. In this method, the steps of reacting the isocyanates in the presence of the catalyst to form the polycarbodiimide and encapsulating the core particle with the polycarbodiimide to form the dust suppressing agent are typically collectively conducted in 40 minutes or less, typically in 30 minutes or less, and more typically in 20 minutes or less.

Typically, the isocyanates, the catalyst, and the other optional components, such as the silicone surfactant, are applied to the core particle in a mechanical mixer including, but not limited to, a ribbon blender, a plough blender, a processing mixer, an impingement mixer, a rotating drum mixer, and combinations thereof. It is to be appreciated that the technique of mixing may include adding components to the vessel sequentially or concurrently. Also, the components may be added to the vessel at various time intervals and/or temperatures.

The method optionally includes the step of heating the core particle prior to the step of encapsulating the core particle with the polycarbodiimide to form the dust suppressing agent. The core particle may be heated in the reaction vessel or in any container to a temperature typically greater than about 120 and more typically greater than about 150, ° F. prior to or simultaneous with the step of encapsulating the core particle with the polycarbodiimide to form the dust suppressing agent. A preferred temperature range for heating the core particle is from 150 to 180° F. Heating the core particle facilitates the reaction of the components to form the dust suppressing agent.

Further, once the core particle is encapsulated with the polycarbodiimide, the method also optionally includes the step of heating and/or agitating the core particle having the polycarbodiimide applied thereon to further polymerize any un-reacted isocyanates as well as the polycarbodiimide. The core particle having the polycarbodiimide applied thereon can be heated and agitated simultaneously. If heated, the core particle having the polycarbodiimide applied thereon may be heated in the reaction vessel or in any container to a temperature typically greater than about 120 and more typically greater than about 150, ° F. If heated, the core particle having the polycarbodiimide applied thereon is typically heated for a time of from 0.5 to 180, more typically from 2 to 120, and most typically from 5 to 60, minutes. If agitated, the step of agitating the core particle having the polycarbodiimide applied thereon may be agitated with techniques including, but not limited to, stirring, mixing, shaking, and combinations thereof. If agitated, the encapsulated particle is typically agitated for a time of from 0.5 to 180, more typically from 2 to 120, and most typically from 5 to 60, minutes. Of course, the steps of heating and/or agitating the core particle having the polycarbodiimide applied thereon can be repeated.

The step of encapsulation can occur once or can be repeated. If repeated the step does not have to be the same each individual time. The core particle may be encapsulated one time with the polycarbodiimide or multiple times with the polycarbodiimide.

That is, the dust suppressing aggregate can be encapsulated by one or more layers of the dust suppressing agent. Further, the dust suppressing aggregate can include additional layers, such as a layer comprising wax (like the outer layer described above) or a layer comprising polyurethane. Further, the dust suppressing agent can be used in combination with dust suppressing agents known in the art, such as liquid dust suppressing agents. Typically, the dust suppressing aggregate is encapsulated by a single layer of the dust suppressing agent.

In one embodiment, the dust suppressing aggregate is formed as described immediately below. To start, the core particle comprising Mosaic MES-Z (a fertilizer commercially available from Mosaic of Plymouth, Minn.), the isocyanates comprising LUPRANATE® M20, and the catalyst comprising a solution of 50 weight percent dipropylene glycol and 50 weight percent 3-methyl-1-phenyl phospholene oxide, is pre-heated to a temperature of 180° F. The pre-heated core particle, in an amount of 2 kg., is added to a 5 gallon pail. The pail, having the core particle therein is rotated at 26 rpm. The isocyanates and the catalyst are sequentially added to the rotating pail using a paint sprayer with air assist. More specifically, the catalyst is added over a period of 30 seconds, once the catalyst is added, the pail is rotated for an additional 2 minutes. The isocyanates are then added over a period of 60 seconds and once the isocyanates are added, the pail is rotated for an additional 10 minutes. After the pail is rotated for 10 minutes, the dust suppressing aggregate, including the dust suppressing agent comprising polycarbodiimide disposed about the core particle, is non-tacky, free flowing, and particulate in form.

The following examples illustrate the nature of the invention and are not to be construed as limiting of the invention. Unless otherwise indicated, all parts are given as parts by weight.

EXAMPLES

Example Dust Suppressing Aggregates (Examples) A and B and a Comparative Example are described herein. Examples A and B include a core particle and a dust suppressing agent comprising polycarbodiimide disposed about the core particle. Examples A and B are formed in accordance with the present invention. The Comparative Example is not formed in accordance with the present invention and is included for comparative purposes.

To form Examples A and B, a dust suppressing agent comprising polycarbodiimide is disposed about a core particle. The compositions used to form Examples A and B, in grams, are set forth below in Table 1.

A Catalyst Solution comprising 50 parts by weight MPPO and 50 parts by weight Dipropylene Glycol is formed in a first vessel and pre-heated to a temperature of 180° F. An Isocyanate is pre-heated to a temperature of 180° F. in a second vessel. The Core Particle is pre-heated to a temperature of 180° F. in a third vessel. Once pre-heated, the Core Particle is added to a reaction vessel (5-gallon pail) which is rotating at 26 rpm. Once the Core Particle is added, the isocyanate and the Catalyst Solution are sequentially added to the reaction vessel using a paint sprayer with air assist. More specifically, the Catalyst Solution is added over a period of 30 seconds, once the Catalyst Solution is added, the reaction vessel is rotated for an additional 2 minutes. The Isocyanate is then added over a period of 60 seconds and once the Isocyanate is added, the reaction vessel is rotated for an additional 10 minutes. While rotating for 10 minutes, the Isocyanate reacts in the presence of the Catalyst Solution to form and dispose dust suppressing agent comprising polycarbodiimide about the Core Particle. As such, the non-tacky, free flowing, and particulate dust suppressing aggregates of Examples A and B are formed.

TABLE 1

|  | Comparative Example | Example A | Example B |
|---|---|---|---|
| MPPO | — | 0.9 | 1.8 |
| Dipropylene Glycol | — | 0.9 | 1.8 |
| Isocyanate | — | 18.2 | 36.4 |
| Core Particle | 2000 | 2000 | 2000 |
| Total | 2000 | 2020 | 2040 |
| Weight Percent Dust Suppressing Agent Applied (%) | 0.0 | 1.0 | 2.0 |
| Initial Dust Value (ppm) | 344 | 33 | 72 |
| Dust Reduction Gradient (%) | NA | 90.4 | 79.1 |

TABLE 1-continued

| | Comparative Example | Example A | Example B |
|---|---|---|---|
| Dissolution (%) (8 hours at 23° C.) | 68.3 | 64.2 | 46.0 |
| Dissolution Gradient (%) | NA | 4.1 | 22.3 |

MPPO is 3-methyl-1-phenyl-2-phospholene oxide.

Dipropylene Glycol is, as stated, dipropylene glycol.

Isocyanate is LUPRANATE® M20, a polymeric methylene diphenyl diisocyanate commercially available from BASF Corporation of Florham Park, N.J.

Core Particle is SGN 250 (granular urea), a fertilizer commercially available from CF Industries of Deerfield, Ill. The urea granules are sifted with US #5 and US #16 sieves to control particle size (i.e., having a particle size between US #5 and US #16) prior to use.

Dust value (ppm) is measured by placing 50 g sample of each Example dust suppressing aggregate in a 125 mL wide mouth glass jar. The jar is placed in a Burrell Model 75 wrist-action shaker, and shaken for 20 minutes at the maximum intensity setting (10). After shaking, the sample is weighed and then processed in a dust removal apparatus. The dust removal apparatus consists of a 2.5 in. diameter plastic cup, a cup holder, an air flow meter, and a vacuum cleaner. The base of the cup is removed and replaced with a 200 mesh screen. Each sample is placed into the cup, the cup is placed into the holder, and then air is drawn through the sample for two minutes at a rate of 9 standard cubic feet per minute using the vacuum cleaner. The sample is then re-weighed. The amount of dust is calculated from the weight difference before and after dust removal. Results are reported as an average of two replicates.

A dust reduction gradient (%) is determined with the dust value. The dust reduction gradient is calculated with the following formula:

[(Dust Value A−Dust Value B)/Dust Value A]×100

Dust Value A is the dust value of the uncoated core particle

Dust Value B is the dust value of the dust suppressing aggregate comprising an identical core particle.

Dissolution (%) is measured by placing 50 g sample of each Example dust suppressing aggregate in a 250 mL plastic bottle. Then 230 g of deionized water is added to the bottle. The plastic bottle is allowed to stand undisturbed for 8 hours at room temperature (23° C.). A liquid sample is then drawn, and its refractive index is measured using a refractometer. An amount (in grams) of the core particle dissolved in each solution sample is calculated using the refractive index and a temperature-corrected standard curve. The amount of the core particle dissolved is utilized to calculate dissolution (%) (e.g. percent urea dissolved) with the following formula:

Dissolution (%)=$X$/(50−(Weight Percent Dust Suppressing Agent Applied/2))

$X$=the amount of core particle (grams) dissolved in the solution sample.

% Coating=100%×Dust Suppressing Agent Applied/Weight of Dust Suppressing Aggregate A dissolution gradient is determined with the dissolution (%). The dissolution gradient is simply the difference in the dissolution (%) of the uncoated core particle and the dissolution of the core particle of the dust suppressing aggregate. Said differently, once the dissolution for the uncoated core particle and the dust suppressing aggregate are determined under certain conditions, the dissolution gradient is absolute value of the dissolution (%) of the uncoated core particle minus the dissolution of the dust suppressing aggregate. Typically, the smaller the dissolution gradient, the better. Although the dust suppressing agent should inhibit dusting of the core particle, it is typically desired that the dust suppressing agent minimally impact the dissolution of the core particle.

Referring again to Table 1, the dust suppressing agent of Examples A and B, comprising polycarbodiimide, encapsulates the Core Particle and prevents dust formation upon mechanical abrasion, as indicated by the lower initial dust values and higher dust reduction gradient values. The initial dust value of Examples A and B are substantially lower than the initial dust value of the Comparative Example (uncoated Core Particle). Notably, the dust value of Example A, which includes 1% by weight dust suppressing agent based on 100% by weight core particle, is even lower than the dust value of Example B, which includes 2% by weight dust suppressing agent based on 100% by weight core particle. Further, the dust suppressing agents of Examples A and B do not significantly inhibit or prevent the dissolution of the Core Particle, as indicated by the low dissolution gradients. Notably, the dissolution gradient of Example A, which includes 1% by weight dust suppressing agent based on 100% by weight core particle, is even lower than the dissolution gradient of Example B, which includes 2% by weight dust suppressing agent based on 100% by weight core particle. As such, Example A, which includes 1% by weight dust suppressing agent based on 100% by weight core particle, exhibits particularly good performance.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the present invention may be practiced otherwise than as specifically described.

What is claimed is:

1. A dust suppressing aggregate comprising:
   A. a core particle comprising fertilizer; and
   B. a dust suppressing agent disposed about said core particle and comprising polycarbodiimide comprising the reaction product of isocyanates in the presence of a catalyst.

2. A dust suppressing aggregate as set forth in claim 1 wherein said dust suppressing agent is present in an amount of from 0.1 to 7.5 parts by weight based on 100 parts by weight of said core particle.

3. A dust suppressing aggregate as set forth in claim 1 having a dust reduction gradient of greater than 20%.

4. A dust suppressing aggregate as set forth in claim 1 having a dissolution gradient equal to or less than 30 after 1 day of aging in water at 38° C.

5. A dust suppressing aggregate as set forth in claim 1 wherein said isocyanates comprise polymeric diphenylmethane diisocyanate and has an NCO content of about 31.5 weight percent.

6. A dust suppressing aggregate as set forth in claim 1 wherein said isocyanates comprise 4,4'-diphenylmethane diisocyanate and has an NCO content of about 33.5 weight percent.

7. A dust suppressing aggregate as set forth in claim 1 wherein said isocyanates are further defined as a first isocyanate comprising polymeric diphenylmethane diisocyanate and having an NCO content of about 31.5 weight percent and a second isocyanate comprising 4,4'-diphenylmethane diisocyanate and having an NCO content of about 33.5 weight percent and said dust suppressing agent comprising a polycarbodiimide comprising the reaction product of said first and second isocyanates in the presence of the catalyst.

8. A dust suppressing aggregate as set forth in claim 7 wherein said first isocyanate and said second isocyanate react in a weight ratio of 4:1 to 1:4 to form said polycarbodiimide.

9. A dust suppressing aggregate as set forth in claim 1 wherein said core particle comprises monoammonium phosphate and/or urea.

10. A method of forming a dust suppressing aggregate comprising a core particle comprising fertilizer and a dust suppressing agent disposed about the core particle, said method comprising the steps of:
    A. reacting isocyanates in the presence of a catalyst to form a polycarbodiimide; and
    B. encapsulating the core particle with the polycarbodiimide to form the dust suppressing agent.

11. A method as set forth in claim 10 wherein the dust suppressing agent is present in an amount of from 0.1 to 7.5 parts by weight based on 100 parts by weight of the core particle.

12. A method as set forth in claim 10 further comprising the step of heating the core particle to a temperature of greater than about 120° F. prior to the step of encapsulating the core particle with the polycarbodiimide to form the dust suppressing agent.

13. A method as set forth in claim 10 further comprising the step of heating the core particle to a temperature of greater than about 150° F. prior to the step of encapsulating the core particle with the polycarbodiimide to form the dust suppressing agent.

14. A method as set forth in claim 10 further comprising the step of heating at least one of the isocyanates and the catalyst to a temperature of greater than about 120° F. prior to the step of reacting the isocyanates in the presence of the catalyst to form the polycarbodiimide.

15. A method as set forth in claim 10 wherein the step of reacting the isocyanates in the presence of the catalyst to form the polycarbodiimide is conducted simultaneous with the step of encapsulating the core particle with the polycarbodiimide to form the dust suppressing agent.

16. A method as set forth in claim 10 wherein the steps of reacting an isocyanates in the presence of a catalyst to form a polycarbodiimide and encapsulating the core particle with the polycarbodiimide to form the dust suppressing agent are conducted in about 40 minutes or less.

17. A method as set forth in claim 10 further comprising the step of spray applying at least one of the isocyanates and the catalyst onto the core particle.

18. A system for producing a dust suppressing aggregate including a core particle comprising fertilizer and a dust suppressing agent comprising polycarbodiimide comprising the reaction product of isocyanates in the presence of a catalyst and disposed about said core particle, wherein the dust suppressing agent is present in an amount of from 0.1 to 7.5 parts by weight based on 100 parts by weight of the core particle, said system comprising:
    A. said isocyanates;
    B. said catalyst for chemically reacting said isocyanates to produce the polycarbodiimide that minimizes dust while having minimal impact on dissolution of said core particle; and
    C. said core particle comprising fertilizer.

19. A system as set forth in claim 18 wherein said isocyanates comprise polymeric diphenylmethane diisocyanate having an NCO content of about 31.5 weight percent.

20. A system as set forth in claim 18 wherein said catalyst is a phosphorous compound.

* * * * *